US012770475B2

(12) United States Patent
Tachibana

(10) Patent No.: US 12,770,475 B2
(45) Date of Patent: Oct. 20, 2026

(54) MONEY PROCESSING APPARATUS

(71) Applicant: GLORY LTD., Himeji (JP)

(72) Inventor: Yusaku Tachibana, Hyogo (JP)

(73) Assignee: GLORY LTD., Himeji (JP)

( * ) Notice: Subject to any disclaimer, the term of this patent is extended or adjusted under 35 U.S.C. 154(b) by 1055 days.

(21) Appl. No.: 17/676,902

(22) Filed: Feb. 22, 2022

(65) Prior Publication Data

US 2023/0267811 A1 Aug. 24, 2023

(51) Int. Cl.
*G07F 19/00* (2006.01)
*G07C 9/00* (2020.01)
*G07D 11/26* (2019.01)
*G07D 11/28* (2019.01)
*G07D 11/40* (2019.01)

(52) U.S. Cl.
CPC ..... *G07F 19/2055* (2013.01); *G07C 9/00912* (2013.01); *G07D 11/26* (2019.01); *G07D 11/28* (2019.01); *G07D 11/40* (2019.01); *G07F 19/205* (2013.01)

(58) Field of Classification Search
CPC ............... G07F 19/2055; G07F 19/205; G07C 9/00912; G07D 11/26; G07D 11/28; G07D 11/40; G07D 11/20
See application file for complete search history.

(56) References Cited

U.S. PATENT DOCUMENTS 5,256,862 A * 10/1993 Watanabe ............. G07F 19/211 235/379
6,640,156 B1 * 10/2003 Brooks .................. G07D 11/40 700/223
7,850,076 B1 * 12/2010 Dorenbaum ........... G07D 11/40 235/379
8,027,920 B1 * 9/2011 Allan .................. G06Q 20/102 705/40
8,100,323 B1 * 1/2012 Crews .................. G06Q 20/382 705/50
8,162,125 B1 * 4/2012 Csulits ................... G07D 11/50 194/207
8,251,360 B2 * 8/2012 Mori ...................... G07D 11/40 270/52.02
8,627,939 B1 * 1/2014 Jones .................... G07F 19/202 194/207
8,819,103 B2 * 8/2014 Fromherz ........... H04L 41/0826 709/201
10,460,570 B2 * 10/2019 Ikeda ..................... A47B 88/40
10,504,084 B2 * 12/2019 Schreckenberg ...... G07D 11/13
10,915,668 B2 * 2/2021 Wesselhoff ............. G06F 21/86
2002/0100660 A1 * 8/2002 Stieber ................... G07D 11/40 194/215
2003/0168508 A1 * 9/2003 Daellenbach ......... G07F 19/205 235/379

(Continued)

FOREIGN PATENT DOCUMENTS

JP 2021-099693 7/2021

*Primary Examiner* — Jeffrey A Shapiro

(74) *Attorney, Agent, or Firm* — Amin, Turocy & Watson, LLP

(57) ABSTRACT

A money processing apparatus includes: a first circuit board that is placed in a safe and integrally controls the money processing apparatus; and a second circuit board that is placed in the safe and communicates with the first circuit board and a computer outside the money processing apparatus.

17 Claims, 5 Drawing Sheets

(56) References Cited

U.S. PATENT DOCUMENTS

| | | | | |
|---|---|---|---|---|
| 2005/0284345 | A1* | 12/2005 | Landwehr | G07F 19/20 109/67 |
| 2007/0258633 | A1* | 11/2007 | Jones | G07D 7/20 382/135 |
| 2012/0073482 | A1* | 3/2012 | Meeker | E05B 47/00 109/23 |
| 2012/0216726 | A1* | 8/2012 | Seibert | G07F 19/20 109/23 |
| 2017/0140597 | A1* | 5/2017 | Takami | G07D 1/02 |
| 2019/0164389 | A1* | 5/2019 | Whytock | G07F 19/205 |
| 2019/0333308 | A1* | 10/2019 | Whytock | G07D 11/16 |
| 2021/0192038 | A1 | 6/2021 | Shibata | |

* cited by examiner

MONEY PROCESSING APPARATUS

TECHNICAL FIELD

The present disclosure relates to a money processing apparatus.

BACKGROUND ART

A money processing apparatus that processes money such as banknotes and coins comprises various devices for processing money, which is a processing target. The money processing apparatus further comprises a controller that controls those devices. The controller is composed of a circuit board on which various electronic components are mounted.

SUMMARY

A banknote processing apparatus according to the present disclosure includes: a first circuit board that is placed in a safe and integrally controls the money processing apparatus; and a second circuit board that is placed in the safe and communicates with the first circuit board and a computer outside the money processing apparatus.

DESCRIPTION OF EMBODIMENTS

Figure 1:
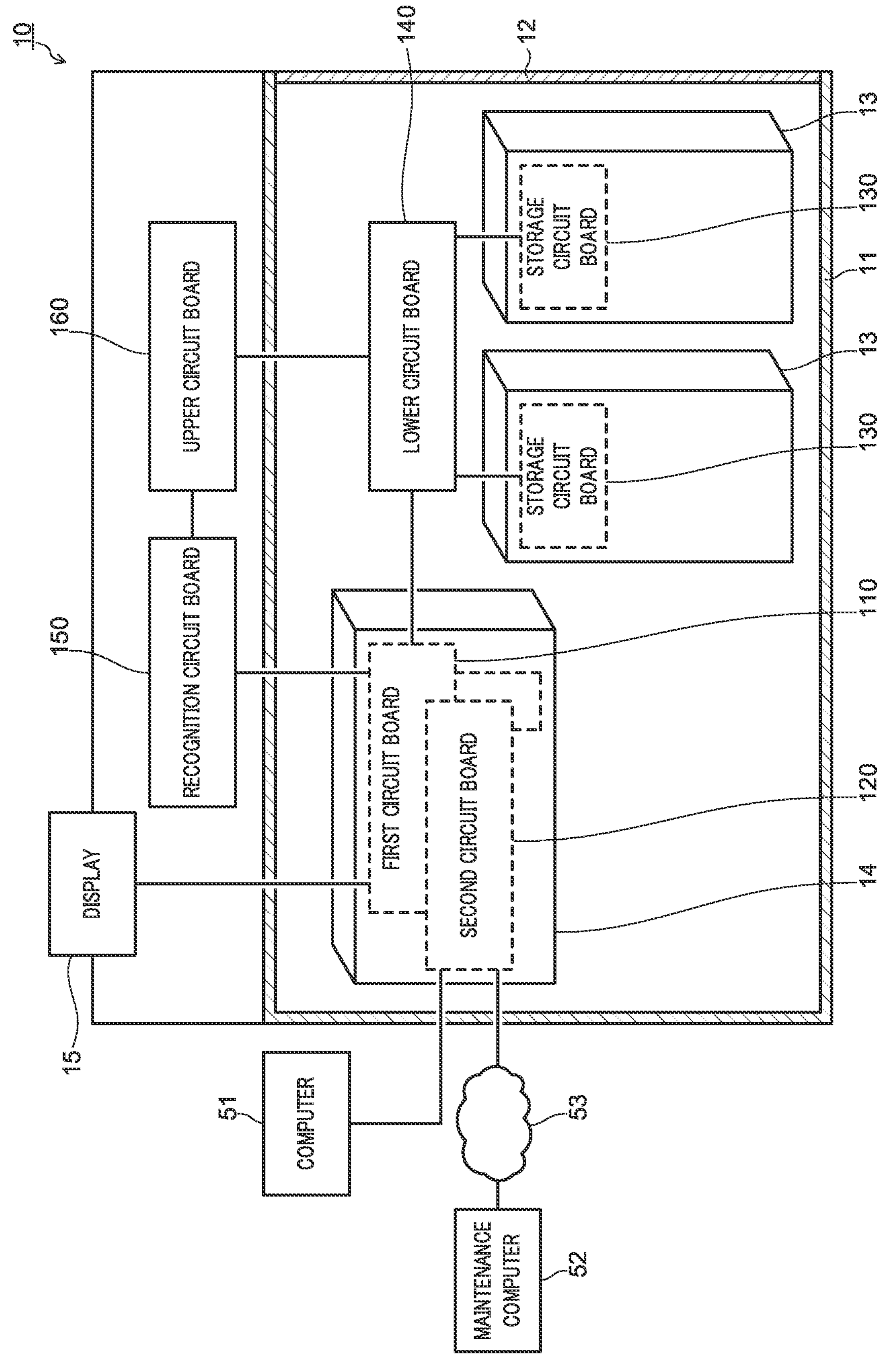
FIG. 1 is a schematic diagram illustrating a money processing apparatus according to an embodiment of the present disclosure.

FIG. 1 is a schematic diagram illustrating a money processing apparatus 10, which is an aspect of the money processing apparatus according to the present disclosure. The money processing apparatus 10 is an apparatus that processes at least one of banknotes and coins and is placed in a facility, e.g., a branch of a financial institution such as a bank (financial branch) or a store such as a convenience store (distribution store). Specific examples are a banknote/coin depositing machine, a banknote/coin depositing and dispensing machine, an automated teller machine, a tax payment machine, a cash exchange machine, a ticketing machine, a vending machine, a change dispenser, a banknote recycler, and an electronic money charging machine. In the following description, the money processing apparatus 10 processes banknotes as money, by way of example.

The money processing apparatus 10 comprises a safe 11. The safe 11 comprises a lockable and unlockable door 12 for opening and closing the safe 11. The inside of the safe 11 can be accessed only by opening the door 12. That is, the inside of the safe 11 cannot be accessed when the door 12 is locked. A device placed inside the safe 11 can be taken out of the safe 11 by opening the door 12 via an opening of the safe 11, which is closed by the door 12.

The money processing apparatus 10 comprises one or more money storage units 13 placed inside the safe 11. The money storage unit 13 is a type of device operating in processing a banknote. The money storage unit 13 stores a banknote deposited into the money processing apparatus 10 and feeds out a banknote to be dispensed from the money processing apparatus 10. Although FIG. 1 illustrates the money processing apparatus 10 comprising two money storage units 13, the money processing apparatus 10 may comprise a single money storage unit 13 or three or more money storage units 13. The money storage units 13 each comprise a storage circuit board 130 to be described later.

The money processing apparatus 10 comprises a circuit board storage box 14. The circuit board storage box 14 is placed inside the safe 11. The circuit board storage box 14 is provided with a first circuit board 110 and a second circuit board 120 inside. The money processing apparatus 10 comprises the safe 11, which is provided with the money storage unit(s) 13 inside, in order to strictly manage banknotes stored inside the money processing apparatus 10. The first circuit board 110 and the second circuit board 120 can also be strictly managed by using the safe 11 as storage of the first circuit board 110 and the second circuit board 120. The circuit board storage box 14 may be configured to be capable of supplying power to the first circuit board 110 and the second circuit board 120. That is, the circuit board storage box 14 may be a power supply box.

The circuit board storage box 14 comprises at least one opening. The opening is formed on one of the side surfaces, which are surfaces other than the top and bottom surfaces, of the circuit board storage box 14, for example. The inside of the circuit board storage box 14 can be accessed via the opening when the door 12 is open and the circuit board storage box 14 is taken out from the safe 11. The opening is large enough for the first circuit board 110 and the second circuit board 120 to pass through. The first circuit board 110 and the second circuit board 120 are placed into the circuit board storage box 14 via the opening, and fixed in the circuit board storage box 14.

The first circuit board 110 is an important component for integrated control of the money processing apparatus 10. The security of the first circuit board 110 is enhanced by placing it in a location less accessible to a malicious third party. Thus, the first circuit board 110 may be placed in a position farther than the second circuit board 120 from the opening of the circuit board storage box 14. In a case where the opening of the circuit board storage box 14 is on the front side of FIG. 1, for example, the first circuit board 110 may be placed at the back of the second circuit board 120. In a case where both the first circuit board 110 and the second circuit board 120 are placed in the circuit board storage box 14, the first circuit board 110 and the second circuit board 120 may be placed so that the first circuit board 110 is accessible only when the second circuit board 120 is taken out. This reduces a risk of access to the first circuit board 110 by a malicious third party or causes extra time to access if the door 12 is unlocked by the malicious third party.

In addition, the circuit board storage box 14 may comprise a lockable inner door. The inner door opens and closes the opening of the circuit board storage box 14. A key to unlock the inner door is different from a key for the door 12, and it is thus possible to prevent the inner door from being unlocked even if the door 12 is unlocked by a malicious third party. That is, this further reduces a risk of access to the first circuit board 110 and the second circuit board 120 by a malicious third party. Note that the key to unlock the door 12 and the key to unlock the inner door may be physical keys or electronic keys such as passwords and biometric information.

The money processing apparatus 10 comprises a display 15 placed outside the safe 11. The display 15 presents various information on the money processing apparatus 10. The display 15 may be configured by a touch-screen display to receive a command on money processing from a user of the money processing apparatus 10. The display 15 is connected to the first circuit board 110. The money processing apparatus 10 may comprise a printer 16 (see FIG. 4).

The money processing apparatus 10 comprises a recognition circuit board 150 and an upper circuit board 160, which are placed outside the safe 11. The recognition circuit board 150 is connected to the first circuit board 110. The upper circuit board 160 is connected to the recognition circuit board 150. The upper circuit board 160 may be directly connected to the first circuit board 110. The recognition circuit board 150 and the upper circuit board 160 are placed outside the safe 11 but still inside a housing of the money processing apparatus 10, and thus cannot be seen nor touched by a user of the money processing apparatus 10.

The recognition circuit board 150 is a controller that controls a recognition device (a type of device operating in processing a banknote) recognizing a banknote to be processed by the money processing apparatus 10. The recognition circuit board 150 controls the recognition device according to a command received from the first circuit board 110, and transmits the recognition result to the first circuit board 110.

The upper circuit board 160 is a controller that controls a device (device operating in processing a banknote) placed in the upper section of the money processing apparatus 10 (i.e., outside the safe 11). The device placed in the upper section of the money processing apparatus 10 includes, for example, an inlet, an outlet, and a transport device transporting a banknote. The upper circuit board 160 controls the device placed in the upper section of the money processing apparatus 10 according to a command received from the first circuit board 110 via the recognition circuit board 150, and transmits various information to the first circuit board 110 as necessary.

The money processing apparatus 10 comprises a lower circuit board 140 and a plurality of storage circuit boards 130, which are placed inside the safe 11. The lower circuit board 140 is connected to the first circuit board 110. The plurality of storage circuit boards 130 are each connected to the lower circuit board 140.

The lower circuit board 140 is a controller that controls a device (device operating in processing a banknote) placed in the lower section of the money processing apparatus 10 (i.e., inside the safe 11). The device placed in the lower section of the money processing apparatus 10 includes, for example, a transport device transporting a banknote. The lower circuit board 140 controls the device placed in the lower section of the money processing apparatus 10 according to a command received from the first circuit board 110, and transmits various information to the first circuit board 110 as necessary.

A storage circuit board 130 is attached to each of money storage units 13. The number of the storage circuit boards 130 is equal to the number of the money storage units 13. The storage circuit board 130 is a controller that controls the money storage unit 13 to which the storage circuit board 130 itself is attached. The storage circuit board 130 controls the money storage unit 13 to which the storage circuit board 130 itself is attached according to a command received from the first circuit board 110 via the lower circuit board 140, and transmits various information to the first circuit board 110 as necessary.

The money processing apparatus 10 is connected to an external computer. The money processing apparatus 10 is connected to, for example, a computer 51, which is a computer for operating the money processing apparatus 10. The money processing apparatus 10 is also connected to, for example, a maintenance computer 52, which is a computer for maintaining the money processing apparatus 10, via a network 53 such as the internet. Additionally, the money processing apparatus 10 may be connected to a computer for managing bank accounts, for example. Such external computers are connected to the second circuit board 120 to be able to communicate with each other. The second circuit board 120 is connected to the first circuit board 110 to be able to communicate with each other.

That is, various devices comprised in the money processing apparatus 10 are directly controlled by the first circuit board 110 or indirectly controlled by the first circuit board 110 via a relay circuit board, such as the lower circuit board 140. External computers are connected to the second circuit board 120 of the money processing apparatus 10. The first circuit board 110 and the second circuit board 120 are configured to communicate with each other.

Figure 2:
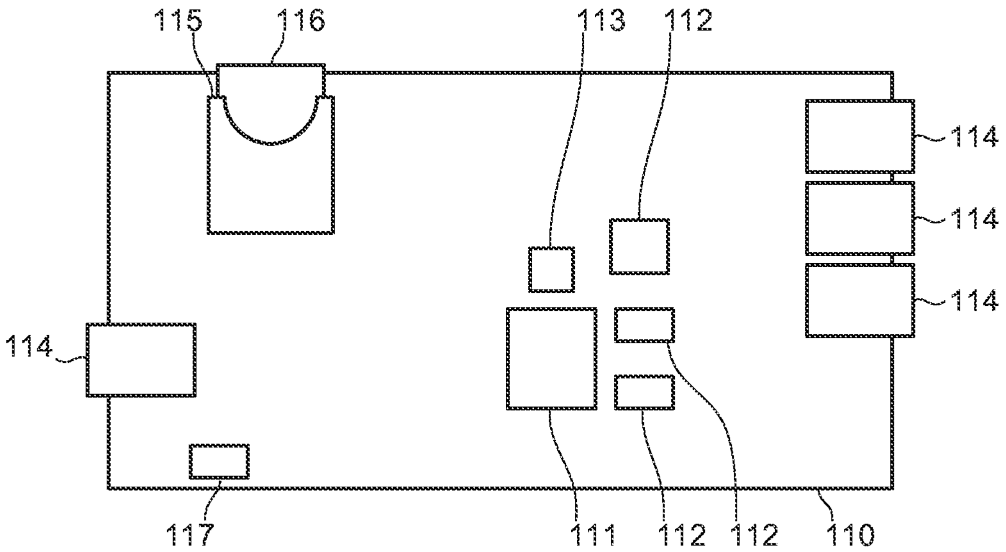
FIG. 2 is a schematic diagram of a first circuit board.

FIG. 2 is a schematic diagram of the first circuit board 110. The first circuit board 110 comprises a CPU 111, a plurality of memory units 112, a secure element 113, a plurality of input/output ports 114, and a memory card socket 115. A memory card 116, such as an SD card, is inserted into the memory card socket 115. The first circuit board 110 comprises a power port 117.

The CPU 111 executes a program stored in a storage area of the CPU 111 itself or in the memory unit 112.

The plurality of memory units 112 are configured by hardware appropriate to respectively assigned roles. At least one of the plurality of memory units 112 stores a program executed by the CPU 111. In this case, the memory unit 112 may be configured by an eMMC, for example. At least one of the plurality of memory units 112 functions as an execution area of a program executed by the CPU 111. In this case, the memory unit 112 may be configured by a RAM, for example.

The secure element 113 is a tamper-resistant semiconductor chip such as a trusted platform module (TPM). The secure element 113 incorporates circuitry that generates a security code. The security code includes, for example, an encryption key, decryption key, hash value, and digital signature. The secure element 113 also incorporates storage circuitry that securely stores the generated security code. Additionally, software performing verification using a security code may be operated in the secure element 113. The secure element 113 is configured so that a security code cannot be easily changed from outside. In other words, a malicious third party cannot tamper with a security code. The secure element 113 performs verification using a security code when, for example, the secure element 113 is activated; that is, when the power supply to the first circuit board 110 is started via the power port 117. The verification will be described later.

The plurality of input/output ports 114 include, for example, a USB port where a USB cable is inserted and a LAN port where a LAN cable is inserted. Via a cable inserted into the input/output port 114, the first circuit board 110 is connected to the second circuit board 120, the display 15, the lower circuit board 140, the recognition circuit board 150, etc., to be able to communicate with each other.

The memory card 116 inserted into the memory card socket 115 stores various information, e.g., log data, required for functioning the money processing apparatus 10.

Figure 3:
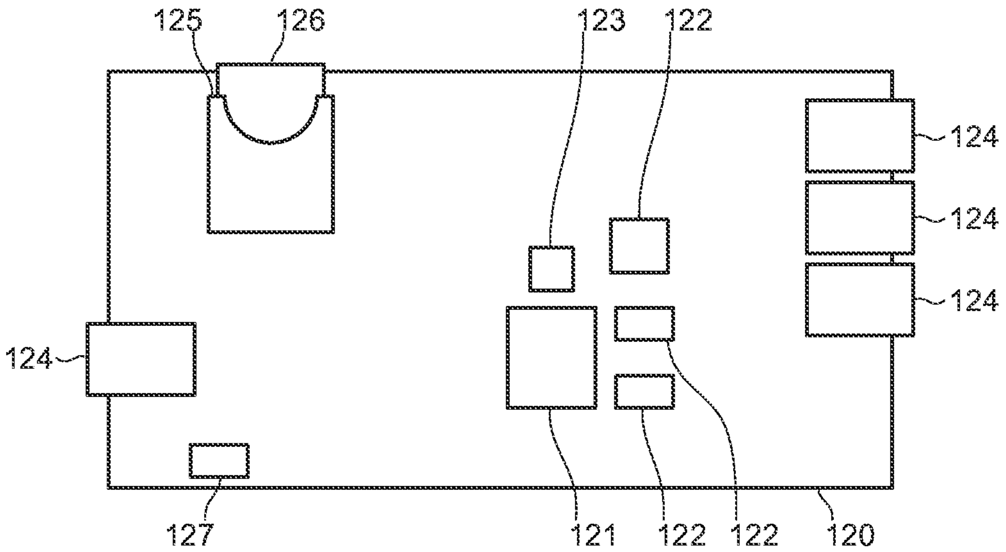
FIG. 3 is a schematic diagram of a second circuit board.

FIG. 3 is a schematic diagram of the second circuit board 120. The hardware configuration of the second circuit board 120 is the same as that of the first circuit board 110. That is, the second circuit board 120 comprises a CPU 121, a plurality of memory units 122, a secure element 123, a plurality of input/output ports 124, and a memory card socket 125, as is the case with the first circuit board 110. A memory card 126, such as an SD card, is inserted into the memory card socket 125. The second circuit board 120 comprises a power port 127.

The layout of the CPU 121, the memory units 122, and the input/output ports 124 on the second circuit board 120 is the same as the layout of the CPU 111, the memory units 112, and the input/output ports 114 on the first circuit board 110. The layout of the secure element 123 and the memory card socket 125 on the second circuit board 120 is the same as the layout of the secure element 113 and the memory card socket 115 on the first circuit board 110.

The CPU 121 executes a program stored in a storage area of the CPU 121 itself or in the memory 122.

The CPU 111 mounted on the first circuit board 110 and the CPU 121 mounted on the second circuit board 120 are the same type of CPUs, i.e., CPUs with the same model number manufactured by the same manufacturer. That is, the CPU 111 and the CPU 121 are CPUs with the same circuit layout. In other words, the types and layout of the elements composing the CPU 111 and the types and layout of the lines connecting those elements to each other are the same as the types and layout of the elements composing the CPU 121 and the types and layout of the lines connecting those elements to each other.

The plurality of memory units 122 are configured by hardware appropriate to respectively assigned roles. At least one of the plurality of memory units 122 stores a program executed by the CPU 121. In this case, the memory unit 122 may be configured by an eMMC, for example. At least one of the plurality of memory units 122 functions as an execution area of a program executed by the CPU 121. In this case, the memory unit 122 may be configured by a RAM, for example.

Comparing the memory units respectively placed in the same position on the circuit boards, the memory unit 112 mounted on the first circuit board 110 and the memory unit 122 mounted on the second circuit board 120 are the same type of memory units, i.e., memory units with the same model number manufactured by the same manufacturer. That is, the memory unit 112 and the memory unit 122 are memory units with the same circuit layout. In other words, the types and layout of the elements composing the memory unit 112 and the types and layout of the lines connecting those elements to each other are the same as the types and layout of the elements composing the memory unit 122 and the types and layout of the lines connecting those elements to each other.

The secure element 123 is a tamper-resistant semiconductor chip such as a trusted platform module (TPM). The secure element 123 incorporates circuitry that generates a security code. The security code includes, for example, an encryption key, decryption key, hash value, and digital signature. The secure element 123 also incorporates storage circuitry that securely stores the generated security code. Additionally, software performing verification using a security code may be operated in the secure element 123. The secure element 123 is configured so that a security code cannot be easily changed from outside. In other words, a malicious third party cannot tamper with a security code. The secure element 123 performs verification using a security code when, for example, the secure element 123 is activated; that is, when the power supply to the second circuit board 120 is started via the power port 127. The verification will be described later.

The secure element 113 mounted on the first circuit board 110 and the secure element 123 mounted on the second circuit board 120 are the same type of semiconductor chips, i.e., semiconductor chips with the same model number manufactured by the same manufacturer. That is, the secure element 113 and the secure element 123 are semiconductor chips with the same circuit layout. In other words, the types and layout of the elements composing the secure element 113 and the types and layout of the lines connecting those elements to each other are the same as the types and layout of the elements composing the secure element 123 and the types and layout of the lines connecting those elements to each other.

The plurality of input/output ports 124 include, for example, a USB port where a USB cable is inserted and a LAN port where a LAN cable is inserted. Via a cable inserted into the input/output port 124, the second circuit board 120 is connected to the first circuit board 110, the external computer 51, the network 53, etc., to be able to communicate with each other.

Comparing the input/output ports respectively placed in the same position on the circuit boards, the input/output port 114 mounted on the first circuit board 110 and the input/output port 124 mounted on the second circuit board 120 are the same type of input/output ports, i.e., input/output ports complying with the same communication standard. That is, the input/output port 114 and the input/output port 124 are input/output ports with the same shape. In other words, the types and layout of a plurality of contacts comprised in the input/output port 114 are the same as the types and layout of a plurality of contacts comprised in the input/output port 124.

The memory card 126 inserted into the memory card socket 125 stores various information, e.g., log data, required for functioning the money processing apparatus 10.

Figure 4:
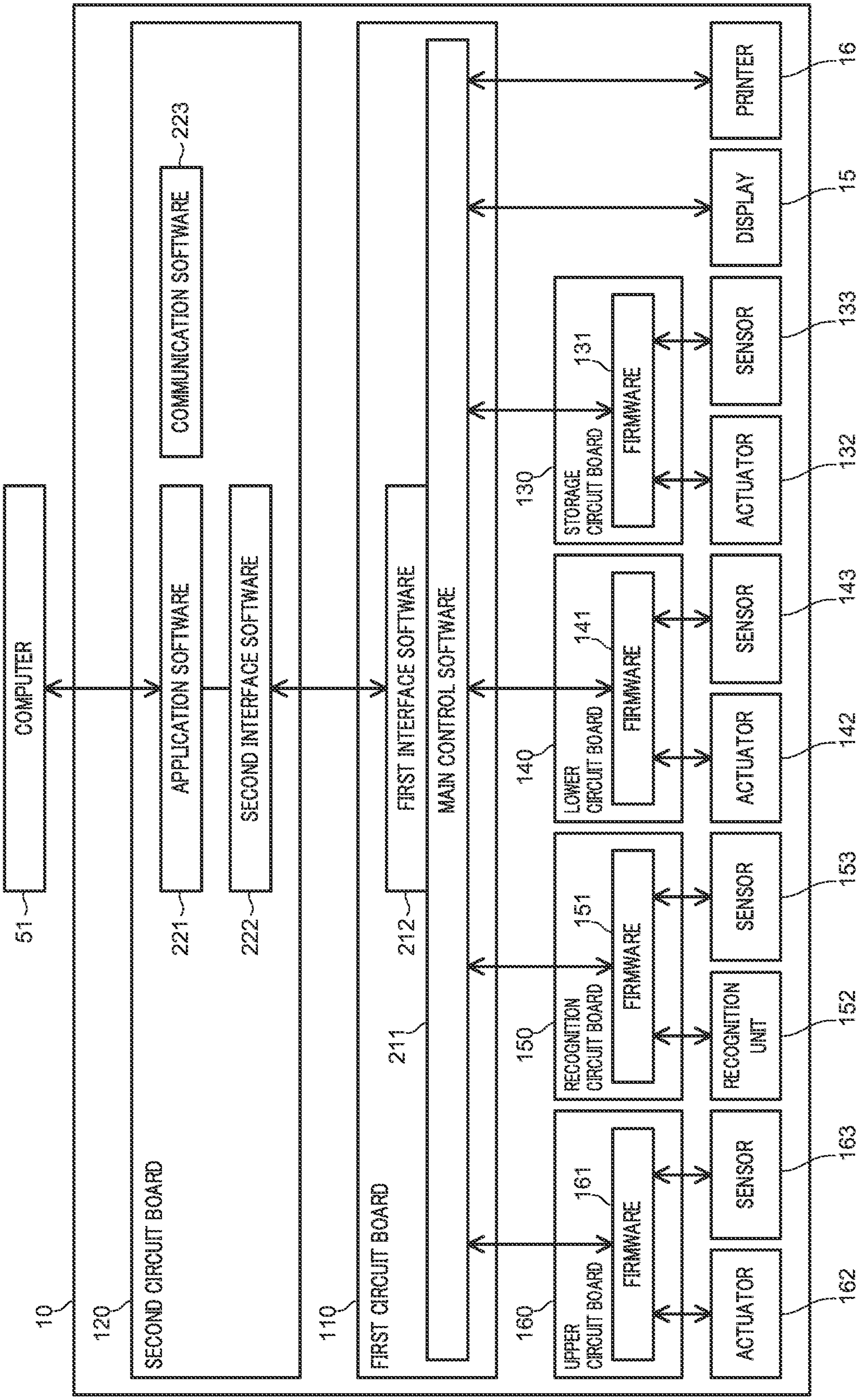
FIG. 4 illustrates software executed in the money processing apparatus according to an embodiment of the present disclosure.

FIG. 4 illustrates software executed in the money processing apparatus 10. The first circuit board 110 executes main control software 211 and first interface software 212. The main control software 211 is software that integrally controls the money processing apparatus 10. The main control software 211 and the first interface software 212 are developed by, for example, a manufacturer of the money processing apparatus 10, and written to the memory unit 112 mounted on the first circuit board 110 at the time of shipment of the money processing apparatus 10.

The first circuit board 110 executes the main control software 211 to work with the storage circuit board 130 that executes firmware 131, and controls an actuator 132 and a sensor 133 comprised in the money storage unit 13. That is, the first circuit board 110 executes the main control software 211 to generate various commands for controlling the money storage unit 13. Note that the firmware 131 executed by the storage circuit board 130 is software for operating various devices comprised in the money storage unit 13.

The first circuit board 110 executes the main control software 211 to work with the lower circuit board 140 that executes firmware 141, and controls an actuator 142 and a sensor 143 comprised in a device placed in the lower section of the money processing apparatus 10. That is, the first circuit board 110 executes the main control software 211 to generate various commands for controlling the device placed in the lower section of the money processing apparatus 10. Note that the firmware 141 executed by the lower circuit board 140 is software for operating various devices comprised in the device placed in the lower section of the money processing apparatus 10.

The first circuit board 110 executes the main control software 211 to work with the recognition circuit board 150 that executes firmware 151, and controls a recognition unit 152 and a sensor 153 comprised in the recognition device. That is, the first circuit board 110 executes the main control software 211 to generate various commands for controlling the recognition device. Note that the firmware 151 executed by the recognition circuit board 150 is software for operating various devices comprised in the recognition device.

The first circuit board 110 executes the main control software 211 to work with the upper circuit board 160 that executes firmware 161, and controls an actuator 162 and a sensor 163 comprised in a device placed in the upper section of the money processing apparatus 10. That is, the first circuit board 110 executes the main control software 211 to generate various commands for controlling the device placed in the upper section of the money processing apparatus 10. Note that the firmware 161 executed by the upper circuit board 160 is software for operating various devices comprised in the device placed in the upper section of the money processing apparatus 10.

The first circuit board 110 executes the main control software 211 to control the display 15 and the printer 16. That is, the first circuit board 110 executes the main control software 211 to generate various commands for controlling the display 15 and the printer 16. Note that the display 15 and the printer 16 may execute firmware that is software for operating themselves.

The first circuit board 110 can include a function to interface with software executed outside the first circuit board 110 by executing the first interface software 212. The first interface software 212 complies with, for example, representational state transfer (REST) or simple object access protocol (SOAP). The software executed outside the first circuit board 110 is software executed on the second circuit board 120 to be more specific.

The second circuit board 120 executes second interface software 222 and communication software 223. The second circuit board 120 may further execute application software 221. The application software 221 is developed by, for example, a business operator (e.g., a financial institution such as a bank, or a distribution institution such as a store) that purchases and uses the money processing apparatus 10 to provide a service, and written to the memory unit 122 mounted on the second circuit board 120 before the money processing apparatus 10 is used. The second interface software 222 and the communication software 223 are developed by, for example, a manufacturer of the money processing apparatus 10, and written to the memory unit 122 mounted on the second circuit board 120 at the time of shipment of the money processing apparatus 10.

The application software 221 generates a screen to be presented on the display 15 for receiving an operation from a user of the money processing apparatus 10. That is, the application software 221 is user interface software to control the display 15 and realize a user interface. In addition, the application software 221 passes a command for realizing the user interface to the second interface software 222. The second interface software 222 prepares the command received from the application software 221 in a format that the first circuit board 110 can process, and transmits the command to the first interface software 212 executed on the first circuit board 110. The first interface software 212 passes the received command to the main control software 211. The main control software 211 causes the display 15 to present the user interface. A user's operation received on the user interface is processed by the main control software 211. Some of data generated by the main control software 211 for the user's operation is transmitted to the application software 221 via the first interface software 212 and the second interface software 222.

The communication software 223 includes a communication function for the second circuit board 120 to connect to the external computer 51 or the maintenance computer 52.

Note that a user of the money processing apparatus 10 may give a command to the money processing apparatus 10 by operating the external computer 51. The second circuit board 120 may execute the application software 221 in this case as well. Alternatively, the computer 51 may execute software corresponding to the application software 221. In this case, the second interface software 222 receives a command from the computer 51. The second interface software 222 prepares the command in a format that the first circuit board 110 can process, and transmits the command to the first interface software 212 executed on the first circuit board 110. As a result of executing the command, some of data generated by the main control software 211 is transmitted to the computer 51 via the first interface software 212, the second interface software 222, and the communication software 223. In a case where the money processing apparatus 10 is controlled only remotely and operated only by the external computer 51, the memory unit 122 mounted on the second circuit board 120 need not store the application software 221.

The money processing apparatus 10 according to the present disclosure is configured as described above. The first circuit board 110, which integrally controls the money processing apparatus 10, is not directly connected to the outside of the money processing apparatus 10. The second circuit board 120 plays a role of directly connecting to an external network and computer. This configuration allows the first circuit board 110, which is more important than the second circuit board 120 in terms of preventing tampering with the money processing apparatus 10, to be more strongly protected from a computer outside the money processing apparatus 10. The circuit board storing and executing the main control software 211, which is the first circuit board 110 in the aspect illustrated in FIG. 4, is protected from being accessed by an operator when it is required to change or update, for example, software operated by a user of the money processing apparatus 10 (corresponding to the application software 221 in the aspect illustrated in FIG. 4), software serving as an interface between the software operated by a user and the main control software 211 (the second interface software 222 in the aspect illustrated in FIG. 4), or software functioning for external communication of the money processing apparatus 10 (the communication software 223 in the aspect illustrated in FIG. 4). That is, it is possible to more reliably prevent the main control software 221 from being changed or updated intentionally or negligently.

Further, the first circuit board 110 and the second circuit board 120 are both placed inside the safe 11, thus preventing the physical access to the first circuit board 110 or the second circuit board 120 by a malicious third party.

When the money processing apparatus 10 is turned on and supplied with power, the first circuit board 110 and the second circuit board 120 are also supplied with power.

At this time, the first circuit board 110 performs verification of various devices connected to the first circuit board 110 and software operating in the devices. The verifier is the secure element 113 mounted on the first circuit board 110 to be more specific. The verification subjects are the storage circuit board 130, the firmware 131, the actuator 132, the sensor 133, the lower circuit board 140, the firmware 141, the actuator 142, the sensor 143, the recognition circuit board 150, the firmware 151, the recognition unit 152, the sensor 153, the upper circuit board 160, the firmware 161, the actuator 162, the sensor 163, the display 15, and the printer 16, to be more specific. The verification is to confirm whether the hardware or software is legitimate.

The secure element 113 mounted on the first circuit board 110 performs the verification of the software executed on the first circuit board 110, which is the main control software 211 and the first interface software 212 to be more specific. The secure element 123 mounted on the second circuit board 120 performs the verification of the software executed on the second circuit board 120, which is the application software 221 and the second interface software 222 to be more specific.

Further, the first circuit board 110 authenticates the second circuit board 120, and the second circuit board 120 authenticates the first circuit board 110. To be more specific, the secure element 113 mounted on the first circuit board 110 verifies, by using a self-stored security code, whether the various devices mounted on the second circuit board 120 (e.g., the CPU 121, the memory unit 122, and the secure element 123) are legitimate and whether a security code embedded in the secure element 123 is legitimate. The verification may be performed by the CPU 111. When the second circuit board 120 is confirmed to be in a legitimate state as a result of the verification, the first circuit board 110 allows activation of the second circuit board 120. Likewise, the secure element 123 mounted on the second circuit board 120 verifies, by using a self-stored security code, whether the various devices mounted on the first circuit board 110 (e.g., the CPU 111, the memory unit 112, and the secure element 113) are legitimate and whether a security code embedded in the secure element 113 is legitimate. The verification may be performed by the CPU 121. When the first circuit board 110 is confirmed to be in a legitimate state as a result of the verification, the second circuit board 120 allows activation of the first circuit board 110.

In a case where part or all of the first circuit board 110 is changed intentionally or negligently, the second circuit board 120 fails to authenticate the first circuit board 110. In this case, the money processing apparatus 10 is not activated. Likewise, in a case where part or all of the second circuit board 120 is changed intentionally or negligently, the first circuit board 110 fails to authenticate the second circuit board 120. In this case, the money processing apparatus 10 is not activated either. This prevents inappropriate or unauthorized use of the money processing apparatus 10 due to the activation of the money processing apparatus 10 with the first circuit board 110 or the second circuit board 120 in a non-legitimate state.

The first circuit board 110 and the second circuit board 120 have the same hardware configuration. In particular, the secure element 113 mounted on the first circuit board 110 and the secure element 123 mounted on the second circuit board 120 are the same type of semiconductor chips. Thus, the secure element 113 mounted on the first circuit board 110 and the secure element 123 mounted on the second circuit board 120 can execute the same software. That is, an algorithm of a program embedded in the secure element 113 mounted on the first circuit board 110 (that is, an authentication algorithm, i.e., an algorithm of a program generating a security code) can be configured to be the same as an algorithm of a program embedded in the secure element 123 mounted on the second circuit board 120 (that is, an authentication algorithm, i.e., an algorithm of a program generating a security code). This configuration enables the first circuit board 110 and the second circuit board 120 to authenticate each other with the same level of accuracy. When the first circuit board 110 and the second circuit board 120 have different authentication levels, the entire authentication level of the combination of the first circuit board 110 and the second circuit board 120 is possibly decreased because one has a high authentication level whereas the other has a low authentication level. In the present embodiment, however, the first circuit board 110 and the second circuit board 120 authenticate each other with the same authentication level. Thus, it is possible to increase the entire authentication level of the combination of the first circuit board 110 and the second circuit board 120 and to improve the entire security of the combination of the first circuit board 110 and the second circuit board 120 accordingly. That is, inappropriate or unauthorized use of the money processing apparatus 10 is more reliably prevented.

The first circuit board 110 may authenticate the second circuit board 120 by, for example, challenge-response authentication or authentication with a common key or public key. In any authentication, the secure element 123 mounted on the second circuit board 120 transmits self-stored or self-generated authentication subject data to the first circuit board 110. The secure element 113 mounted on the first circuit board 110 compares the authentication subject data received from the second circuit board 120 with self-stored or self-generated data for authentication. This allows the secure element 113 mounted on the first circuit board 110 to quickly authenticate not only the secure element 123 mounted on the second circuit board 120 but also the second circuit board 120 eventually.

The secure element 123 mounted on the second circuit board 120 may receive information such as an ID from the CPU 121 and the memory unit 122 mounted on the second circuit board 120, generate the authentication subject data using the information, and transmit the generated authentication subject data to the first circuit board 110. In this case, the secure element 113 mounted on the first circuit board 110 is configured so as to be able to generate the data for authentication using the information such as the IDs of the CPU 121 and the memory unit 122 mounted on the second circuit board 120. Note that the information such as the IDs of the CPU 121 and the memory unit 122 mounted on the second circuit board 120 is embedded in advance in the secure element 113 mounted on the first circuit board 110.

In this case, when the CPU 121 or the memory unit 122 mounted on the second circuit board 120 is replaced for some reason, the information such as the ID is changed; accordingly, the authentication subject data generated and transmitted by the secure element 123 mounted on the second circuit board 120 is also changed. That is, once the CPU 121 or the like is replaced, the authentication subject data transmitted from the second circuit board 120 to the first circuit board 110 is different from the data for authentication generated by the secure element 113 mounted on the first circuit board 110. The secure element 113 mounted on the first circuit board 110 thus fails to authenticate the second circuit board 120. Generating authentication subject data and data for authentication using information on a device mounted on the second circuit board 120 makes it possible to verify that each device mounted on the second circuit board 120 is legitimate, thereby achieving reliable authentication of the second circuit board 120.

The second circuit board 120 can perform the authentication of the first circuit board 110 in the same manner.

Figure 5:
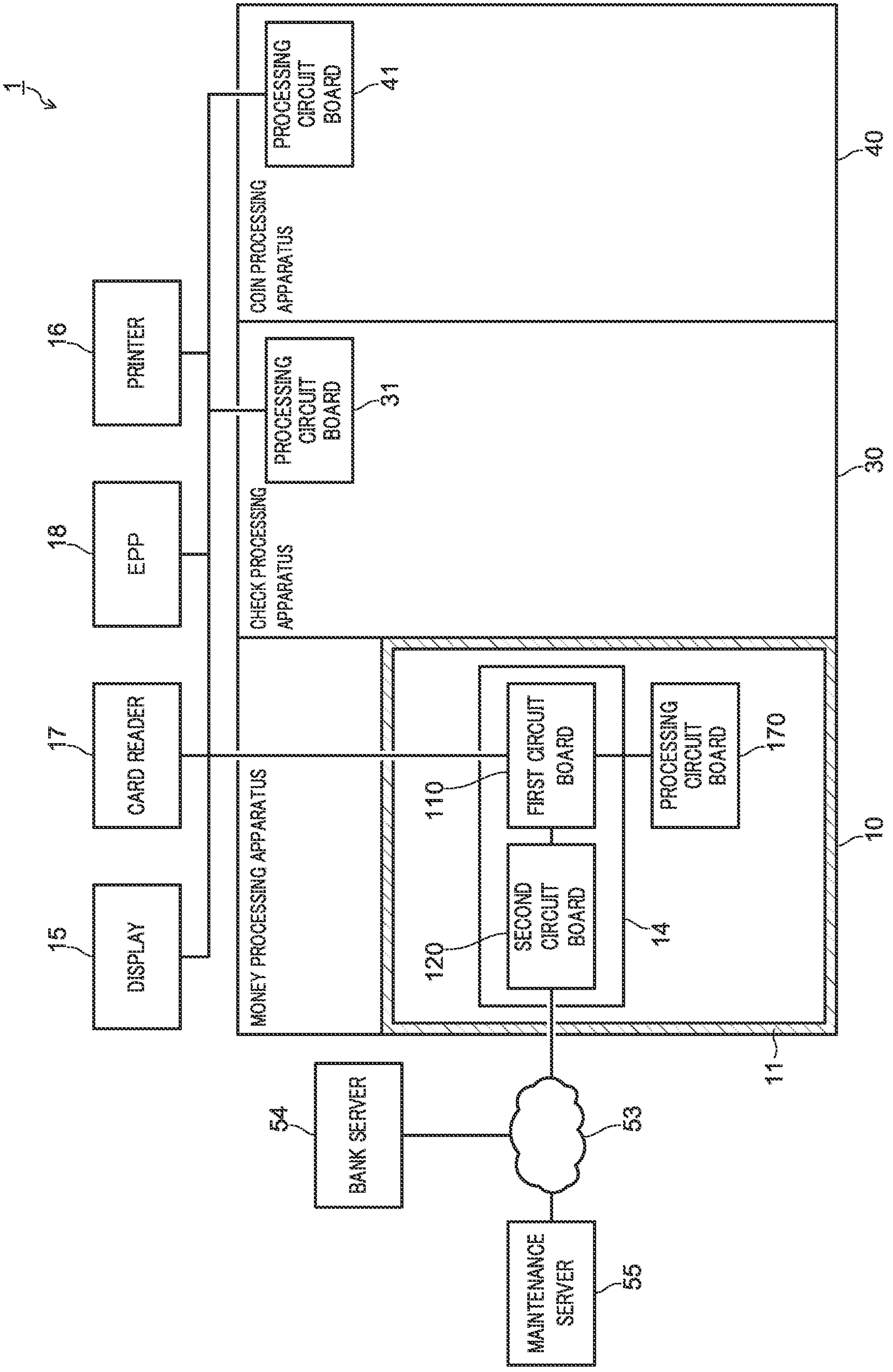
FIG. 5 is a schematic diagram illustrating an aspect of an automated transaction machine comprising the money processing apparatus according to the present disclosure.

FIG. 5 is a schematic diagram illustrating an aspect of an automated transaction machine (ATM) 1 comprising a money processing apparatus 10 according to the present disclosure. The ATM 1 is installed in a bank branch. The ATM 1 comprises a plurality of devices. The devices include medium processing apparatuses, which are the money processing apparatus 10, and a check processing apparatus 30 or a coin processing apparatus 40. The ATM 1 comprises a plurality of medium processing apparatuses placed adjacent to each other. The devices may be a display 15, a printer 16, a card reader 17, or an encrypting PIN pad (EPP) 18. Note that the medium processing apparatus may be a coin-roll processing apparatus that processes a roll of coins or a drop box that stores a medium manually inserted from an inlet.

The money processing apparatus 10 basically has the same configuration as the money processing apparatus 10 illustrated in FIG. 1. In the following, a description of the same configuration or function as the money processing apparatus 10 illustrated in FIG. 1 may be omitted.

The money processing apparatus 10 comprises a safe 11. Inside the safe 11, a circuit board storage box 14 is placed. Inside the circuit board storage box 14, a first circuit board 110 and a second circuit board 120 are placed. The first circuit board 110 and the second circuit board 120 are connected to each other and authenticate each other. The money processing apparatus 10 comprises a processing circuit board 170. The processing circuit board 170 is a general term for the storage circuit board 130, the lower circuit board 140, the recognition circuit board 150, and the upper circuit board 160, which are illustrated in FIG. 1.

The first circuit board 110 is connected to the display 15, the printer 16, the card reader 17, and the EPP 18, which are used in operating the ATM 1.

The check processing apparatus 30 is an apparatus for processing checks, and comprises a processing circuit board 31 serving as a controller that controls various devices comprised in the check processing apparatus 30. The processing circuit board 31 is connected to the first circuit board 110. The processing circuit board 31 controls the various devices comprised in the check processing apparatus 30 according to a command received from the first circuit board 110, and transmits various information to the first circuit board 110 as necessary.

The coin processing apparatus 40 is an apparatus for processing coins, and comprises a processing circuit board 41 serving as a controller that controls various devices comprised in the coin processing apparatus 40. The processing circuit board 41 is connected to the first circuit board 110. The processing circuit board 41 controls the various devices comprised in the coin processing apparatus 40 according to a command received from the first circuit board 110, and transmits various information to the first circuit board 110 as necessary.

Although the first circuit board 110 is placed inside the safe 11 of the money processing apparatus 10, which is one of the devices composing the ATM 1, as described above, the first circuit board 110 is a main circuit board of the ATM 1 controlling the money processing apparatus 10 and at least one of the devices other than the money processing apparatus 10.

The ATM 1 is connected to external computers. The external computers include a bank server 54 and a maintenance server 55. The second circuit board 120 is connected to the bank server 54 and the maintenance server 55 via a network 53. Although the second circuit board 120 is placed inside the safe 11 of the money processing apparatus 10, which is one of the devices composing the ATM 1, the second circuit board 120 is an interface circuit board controlling external communication of the ATM 1. The safe 11 may be comprised in a medium processing apparatus other than the money processing apparatus 10. For example, the coin processing apparatus 40 may comprise the safe 11, or the drop box may comprise the safe 11. The first circuit board 110 and the second circuit board 120 may be placed inside the safe 11 of a medium processing apparatus other than the money processing apparatus 10.

Figure 6:
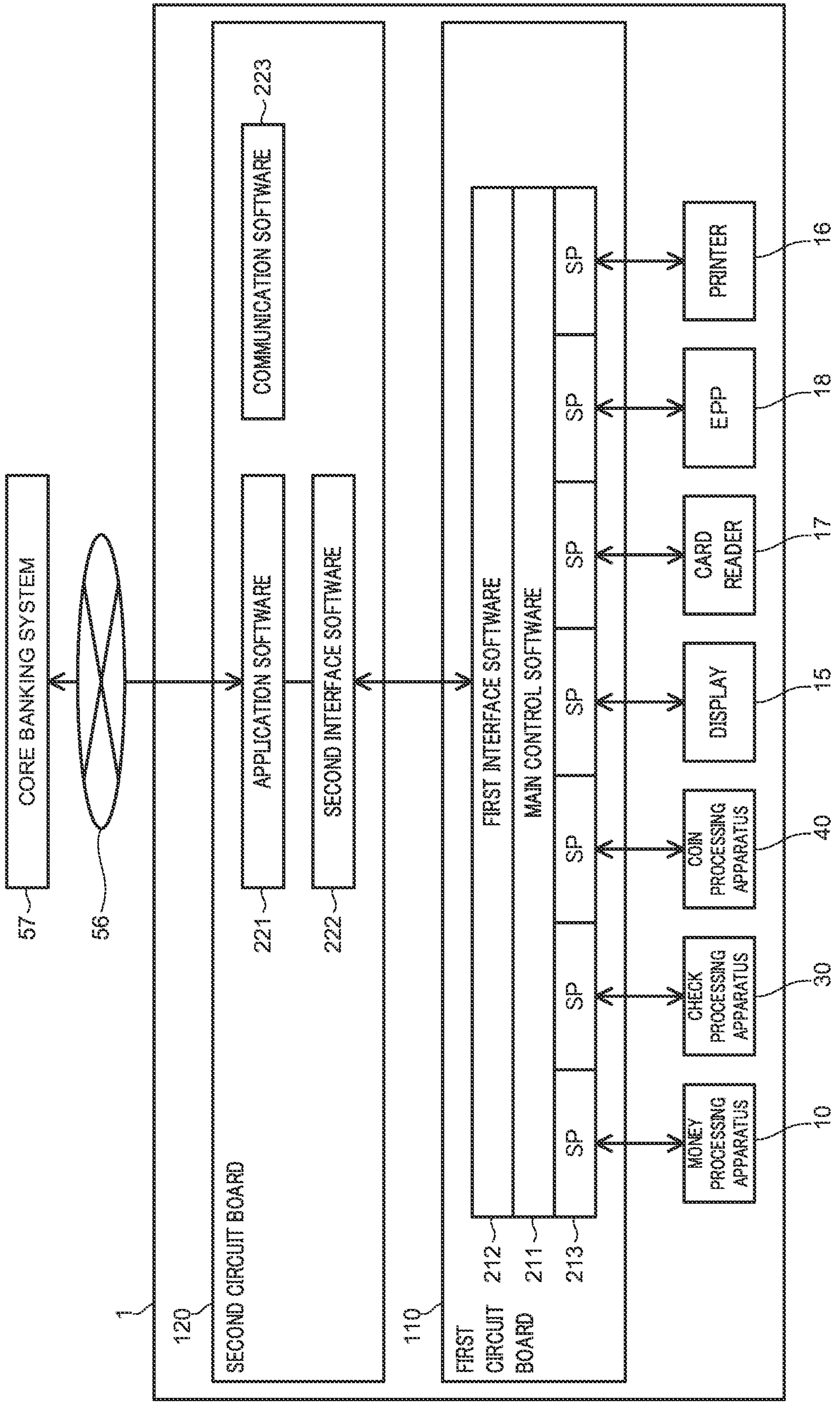
FIG. 6 illustrates software executed in the automated transaction machine according to an embodiment of the present disclosure.

FIG. 6 illustrates software executed in the ATM 1. The first circuit board 110 executes main control software 211, first interface software 212, and a plurality of service providers (SPs) 213.

The main control software 211 is a so-called Extensions for Financial Services (XFS) manager and has a standardized application programming interface (API) on a platform intended to open financial processing apparatuses. The XFS manager distributes commands from higher application software (application software 221 to be described later) to the SPs 213 respectively. Each of the SPs 213 generates, based on the distributed command, a command for a corresponding device, e.g., the money processing apparatus 10 (in the case of the money processing apparatus 10, a component such as the processing circuit board 170 comprised in the money processing apparatus to be more specific). The device that has received the command from the SP 213 operates according to the command That is, the main control software 211 integrally controls the money processing apparatus 10, the check processing apparatus 30, and the coin processing apparatus 40, which compose the ATM 1.

The first circuit board 110 can have a function to interface with external software by executing the first interface software 212.

The second circuit board 120 executes the application software 221, second interface software 222, and communication software 223.

The application software 221 generates a screen to be presented on the display 15 for receiving a command from a user of the ATM 1. In addition, the application software 221 receives a user's operation on the display 15, for example, and passes a command based on the received operation to the second interface software 222. The second interface software 222 prepares the command received from the application software 221 in a format that the first circuit board 110 can process, and transmits the command to the first interface software 212 executed on the first circuit board 110.

The second circuit board 120 is connected to a core banking system 57, which is an example of the bank server 54, via an ATM switch 56, which is an example of the network 53. The core banking system 57 comprises a plurality of computers. At least one of the plurality of computers is configured to manage bank accounts.

Note that the second circuit board 120 need not execute the application software 221 in a case where a user of the ATM 1 gives a command to the ATM 1 by operating an external computer. In this case, the external computer executes software corresponding to the application software 221, and the second interface software 222 receives a command from the external computer. The second interface software 222 prepares the command in a format that the first circuit board 110 can process, and transmits the command to the first interface software 212 executed on the first circuit board 110. In a case where the ATM 1 is controlled only remotely and operated only by an external computer, the memory unit 122 mounted on the second circuit board 120 need not store the application software 221.

Note that the first circuit board 110 and the second circuit board 120 are actually placed inside the safe 11 of the money processing apparatus 10 as illustrated in FIG. 5 although FIG. 6 illustrates the first circuit board 110 and the second circuit board 120 placed outside the money processing apparatus 10 since FIG. 6 is a diagram for describing software.

As is the case with the money processing apparatus 10 described above with reference to FIG. 1 and the like, the ATM 1 according to the present embodiment allows the first circuit board 110 to be more strongly protected from a computer outside the money processing apparatus 10. It is also possible to prevent the physical access to the first circuit board 110 or the second circuit board 120 by a malicious third party. Further, it is possible to prevent inappropriate or unauthorized use of the ATM 1 due to the activation of the ATM 1 with the first circuit board 110 or the second circuit board 120 in a non-legitimate state.

What is claimed is:

1. A money processing apparatus, comprising:

a first circuit board that is placed in a safe and integrally controls the money processing apparatus;

a second circuit board that is placed in the safe, communicates with the first circuit board, and communicates with a computer outside the money processing apparatus without routing communication through the first circuit board, the computer being configured to manage a bank account;

a storage circuit board that is placed in the safe and controls a storage unit in accordance with a command received from the first circuit board; and a circuit board storage box that is placed in the safe and stores the first circuit board and the second circuit board, wherein the first circuit board is indirectly connected to the computer outside the money processing apparatus via the second circuit board, the second circuit board is an interface circuit board that executes communication software that controls communication with the computer, the circuit board storage box comprises an opening that is passable for the first circuit board and the second circuit board when the first circuit board and the second circuit board are attached or taken out, and the first circuit board is placed farther than the second circuit board from the opening.

2. The money processing apparatus according to claim 1, wherein a hardware configuration of the first circuit board is the same as a hardware configuration of the second circuit board.

3. The money processing apparatus according to claim 2, wherein, the first circuit board and the second circuit board each comprise a CPU, a memory, and an input/output port, a layout of the CPU, the memory, and the input/output port comprised in the first circuit board is the same as a layout of the CPU, the memory, and the input/output port comprised in the second circuit board a circuit layout of the CPU comprised in the first circuit board is the same as a circuit layout of the CPU comprised in the second circuit board, a circuit layout of the memory comprised in the first circuit board is the same as a circuit layout of the memory comprised in the second circuit board, and a contact layout of the input/output port comprised in the first circuit board is the same as a contact layout of the input/output port comprised in the second circuit board.

4. The money processing apparatus according to claim 2, wherein, the first circuit board and the second circuit board each comprise a secure element, a circuit layout of the secure element comprised in the first circuit board is the same as a circuit layout of the secure element comprised in the second circuit board, and the secure element comprised in the first circuit board is configured to process an authentication algorithm that is the same as an authentication algorithm processed by the secure element comprised in the second circuit board.

5. The money processing apparatus according to claim 1, wherein the safe comprises a lockable door.

6. The money processing apparatus according to claim 1, wherein the storage unit is a money storage that is placed in the safe and stores money.

7. The money processing apparatus according to claim 1, wherein the circuit board storage box is configured to supply power to the first circuit board and the second circuit board.

8. The money processing apparatus according to claim 1, wherein, the safe comprises a lockable door, the circuit board storage box comprises a lockable inner door, and the lockable inner door is configured so as not to be unlocked with a key used for unlocking the lockable door.

9. The money processing apparatus according to claim 1, further comprising a device that operates in processing money, wherein, the first circuit board executes main control software that generates a command to control the device.

10. The money processing apparatus according to claim 9, wherein the second circuit board executes interface software that serves as an interface between the computer and the main control software.

11. The money processing apparatus according to claim 9, further comprising a display, wherein, the second circuit board executes user interface software that realizes a user interface by controlling the display.

12. The money processing apparatus according to claim 1, wherein, the first circuit board authenticates the second circuit board, and the second circuit board authenticates the first circuit board.

13. The money processing apparatus according to claim 12, wherein, the first circuit board and the second circuit board each comprise a secure element, the secure element comprised in the first circuit board authenticates the second circuit board using data stored in the secure element comprised in the first circuit board, and the secure element comprised in the second circuit board authenticates the first circuit board using data stored in the secure element comprised in the second circuit board.

14. The money processing apparatus according to claim 12, wherein, the first circuit board authenticates validity of software executed on the first circuit board, and the second circuit board authenticates validity of software executed on the second circuit board.

15. The money processing apparatus according to claim 1, wherein, the money processing apparatus is placed adjacent to a medium processing apparatus that processes a medium of a different type from money processed by the money processing apparatus, and the first circuit board integrally controls the medium processing apparatus.

16. The money processing apparatus according to claim 15, wherein, the money processing apparatus is configured to process a banknote, and the medium processing apparatus is configured to process any one or more of a coin, a coin-roll, and a check.

17. A money processing apparatus, comprising:

a first circuit board that is placed in a safe and integrally controls the money processing apparatus;

a second circuit board that is placed in the safe, communicates with the first circuit board, and communicates with a computer outside the money processing apparatus without routing communication through any other circuit board in the money processing apparatus, the computer being configured to manage a bank account;

a storage circuit board that is placed in the safe and controls a storage unit in accordance with a command received from the first circuit board; and a circuit board storage box that is placed in the safe and stores the first circuit board and the second circuit board, wherein the first circuit board is indirectly connected to the computer outside the money processing apparatus via the second circuit board, the circuit board storage box comprises an opening that is passable for the first circuit board and the second circuit board when the first circuit board and the second circuit board are attached or taken out, and the first circuit board is placed farther than the second circuit board from the opening.

* * * * *